(12) United States Patent
Bonnet

(10) Patent No.: US 8,696,315 B2
(45) Date of Patent: Apr. 15, 2014

(54) HUB FOR A WIND TURBINE AND METHOD OF MOUNTING A WIND TURBINE

(75) Inventor: Laurent Bonnet, Mesum (DE)

(73) Assignee: General Electric Company, Schenectady, NY (US)

( * ) Notice: Subject to any disclaimer, the term of this patent is extended or adjusted under 35 U.S.C. 154(b) by 742 days.

(21) Appl. No.: 12/857,025

(22) Filed: Aug. 16, 2010

(65) Prior Publication Data
US 2011/0142658 A1 Jun. 16, 2011

(51) Int. Cl.
*F03D 3/06* (2006.01)

(52) U.S. Cl.
USPC ................................ 416/214 R; 416/245 R

(58) Field of Classification Search
USPC .......... 416/204 R, 131, 132 B, 210 R, 214 R, 416/248, 208, 205, 207, 209; 29/428, 889
See application file for complete search history.

(56) References Cited

U.S. PATENT DOCUMENTS

| | | | | |
|---|---|---|---|---|
| 116,414 A | * | 6/1871 | Cochrane | 403/339 |
| 335,640 A | * | 2/1886 | Simmons | 416/220 R |
| 787,754 A | * | 4/1905 | Freid | 5/280 |
| 1,010,929 A | * | 12/1911 | Loetzer | 416/214 R |
| 2,347,282 A | * | 4/1944 | Roby | 416/207 |
| 4,543,836 A | * | 10/1985 | Call | 73/861.85 |
| 4,611,972 A | * | 9/1986 | Andrae | 416/214 R |
| 4,790,722 A | * | 12/1988 | Herrmann | 416/205 |
| 4,895,458 A | * | 1/1990 | Gerster | 384/126 |
| 5,173,023 A | * | 12/1992 | Pawlowski et al. | 416/207 |
| 6,942,461 B2 | | 9/2005 | Wobben | |
| 2007/0114798 A1 | * | 5/2007 | Cairo | 290/44 |
| 2008/0025847 A1 | * | 1/2008 | Teipen | 416/244 R |
| 2008/0199315 A1 | * | 8/2008 | Bech | 416/61 |
| 2009/0317256 A1 | * | 12/2009 | Quell | 416/204 R |

* cited by examiner

*Primary Examiner* — Nathaniel Wiehe
*Assistant Examiner* — Kayla McCaffrey
(74) *Attorney, Agent, or Firm* — Global Patent Operations; Douglas D. Zhang

(57) ABSTRACT

A modular rotor blade hub for a wind turbine rotor includes a plurality of segments, wherein at least one segment includes at least one face abutting against at least one face of at least one adjacent segment, and wherein at least one of said faces extends from an outer periphery of the hub to a central region of the hub. Further, methods for mounting a wind turbine including a modular hub are provided.

19 Claims, 15 Drawing Sheets

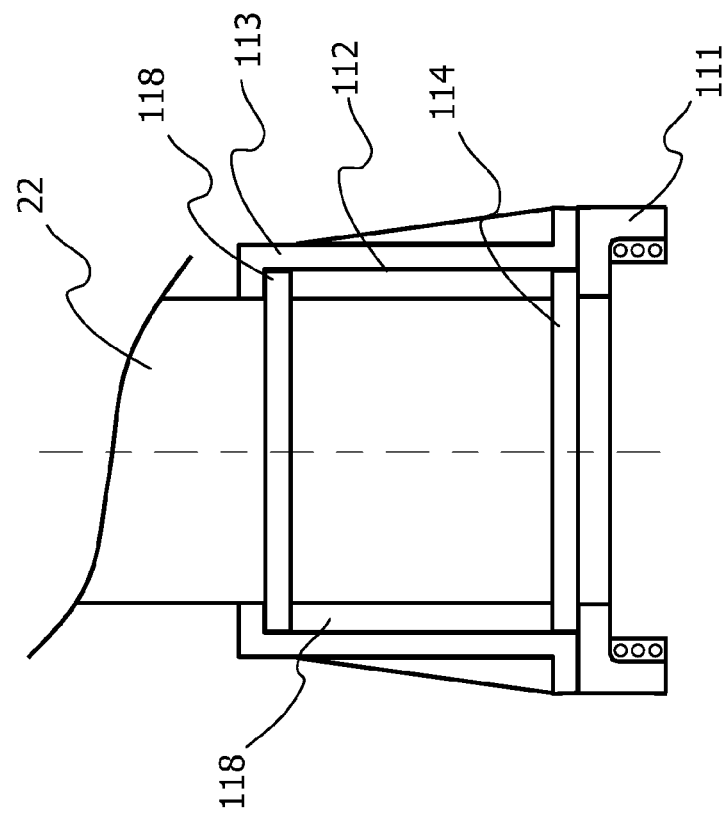
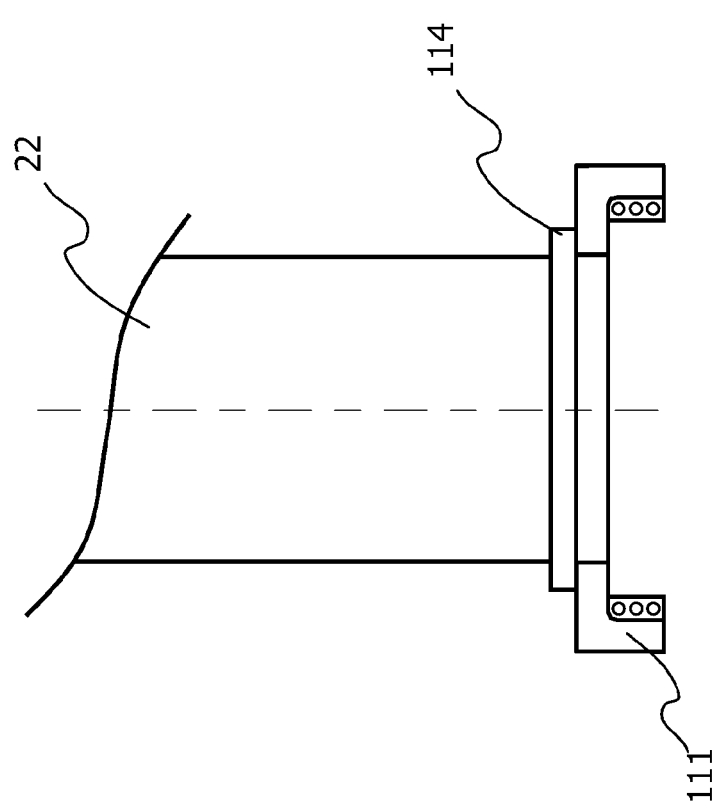

HUB FOR A WIND TURBINE AND METHOD OF MOUNTING A WIND TURBINE

BACKGROUND OF THE INVENTION

The subject matter described herein relates generally to methods and systems for wind turbines, and more particularly, to methods and systems for a modular rotor blade hub for wind turbines.

At least some known wind turbines include a tower and a nacelle mounted on the tower. A rotor is rotatably mounted to the nacelle and is coupled to a generator by a shaft. A plurality of blades extend from the rotor. The blades are oriented such that wind passing over the blades turns the rotor and rotates the shaft, thereby driving the generator to generate electricity.

The development of wind turbines constantly aims for higher power outputs, which leads to increasing size of the installations. In recent years, the size of the largest available turbines on the market has doubled every 5 years, a trend which seems to be becoming more prevalent. One of the reasons for this is the goal of lowering the cost of electricity (in cent per kWh), while at the same time increasing the energy capture (yearly average power output, AEP). Accordingly, it is a general objective to increase both the energy conversion at a given rotor size and to increase the rotor size itself, which leads to a higher average power output.

However, increasing rotor size also means a general increase in machinery and nacelle size, which leads to higher total masses, and also to an increasing mass of the rotor blades and the hub. Accordingly, increasingly heavy components result in the fact that single pitch bearings or yaw bearings reach their tolerable bending moments or thrust components. Hence, larger wind turbine sizes also mean greater dynamic loading and consequently require constructional measures to account for the higher loads. One measure to meet these requirements is to adapt the dimensions of parts, for instance the hub. Consequently, the hub tends to increase in size and weight, which is not desirable in terms of transportability, and the handling at the construction site.

Accordingly, there is a desire for a hub for a wind turbine which delivers improved stability and load bearing capacities for larger wind turbines, while at the same time the effort for transportation shall be reduced and the handling of the hub during construction of the turbine shall be improved.

BRIEF DESCRIPTION OF THE INVENTION

In one aspect, a modular rotor blade hub for a wind turbine rotor is provided. The modular rotor blade hub includes a plurality of segments, wherein at least one segment includes at least one face abutting against at least one face of at least one adjacent segment, and wherein at least one of said faces extends from an outer periphery of the hub to a central region of the hub.

In another aspect, a wind turbine including a modular hub is provided. The wind turbine includes a modular hub including a plurality of segments, each including at least two faces abutting against faces of at least one adjacent segment.

In yet another aspect, a method for mounting a wind turbine is provided. The method includes providing a plurality of segments of a modular hub; arranging the segments in a substantially circular manner about the axis of the hub, such that at least one face of a segment abuts against at least one face of at least one adjacent segment, and wherein at least one of said faces extends from an outer periphery of the hub to a central region of the hub; and, mounting the segments.

Further aspects, advantages, and features of the present invention are apparent from the dependent claims, the description, and the accompanying drawings.

BRIEF DESCRIPTION OF THE DRAWINGS

A full and enabling disclosure, including the best mode thereof to one of ordinary skill in the art, is set forth more particularly in the remainder of the specification, including reference to the accompanying figures wherein:

FIG. 9 is a sectional side view of a rotor blade root portion according to embodiments.

FIG. 10 is a sectional side view of a rotor blade root portion according to further embodiments.

DETAILED DESCRIPTION OF THE INVENTION

Reference will now be made in detail to the various embodiments, one or more examples of which are illustrated in each figure. Each example is provided by way of explanation and is not meant as a limitation. For example, features illustrated or described as part of one embodiment can be used on or in conjunction with other embodiments to yield yet further embodiments. It is intended that the present disclosure includes such modifications and variations.

The embodiments described herein include a wind turbine system that is easy to transport and to assemble. More specifically, the rotor blade hub is easier to transport and to assemble due to its modular configuration.

As used herein, the term "modular hub" is intended to be representative of a hub which includes at least two segments. As used herein, the term "blade" is intended to be representative of any device that provides a reactive force when in motion relative to a surrounding fluid. As used herein, the term "wind turbine" is intended to be representative of any device that generates rotational energy from wind energy, and more specifically, converts kinetic energy of wind into mechanical energy. As used herein, the term "wind generator" is intended to be representative of any wind turbine that generates electrical power from rotational energy generated from wind energy, and more specifically, converts mechanical energy converted from the kinetic energy of wind to electrical power.

Figure 1:
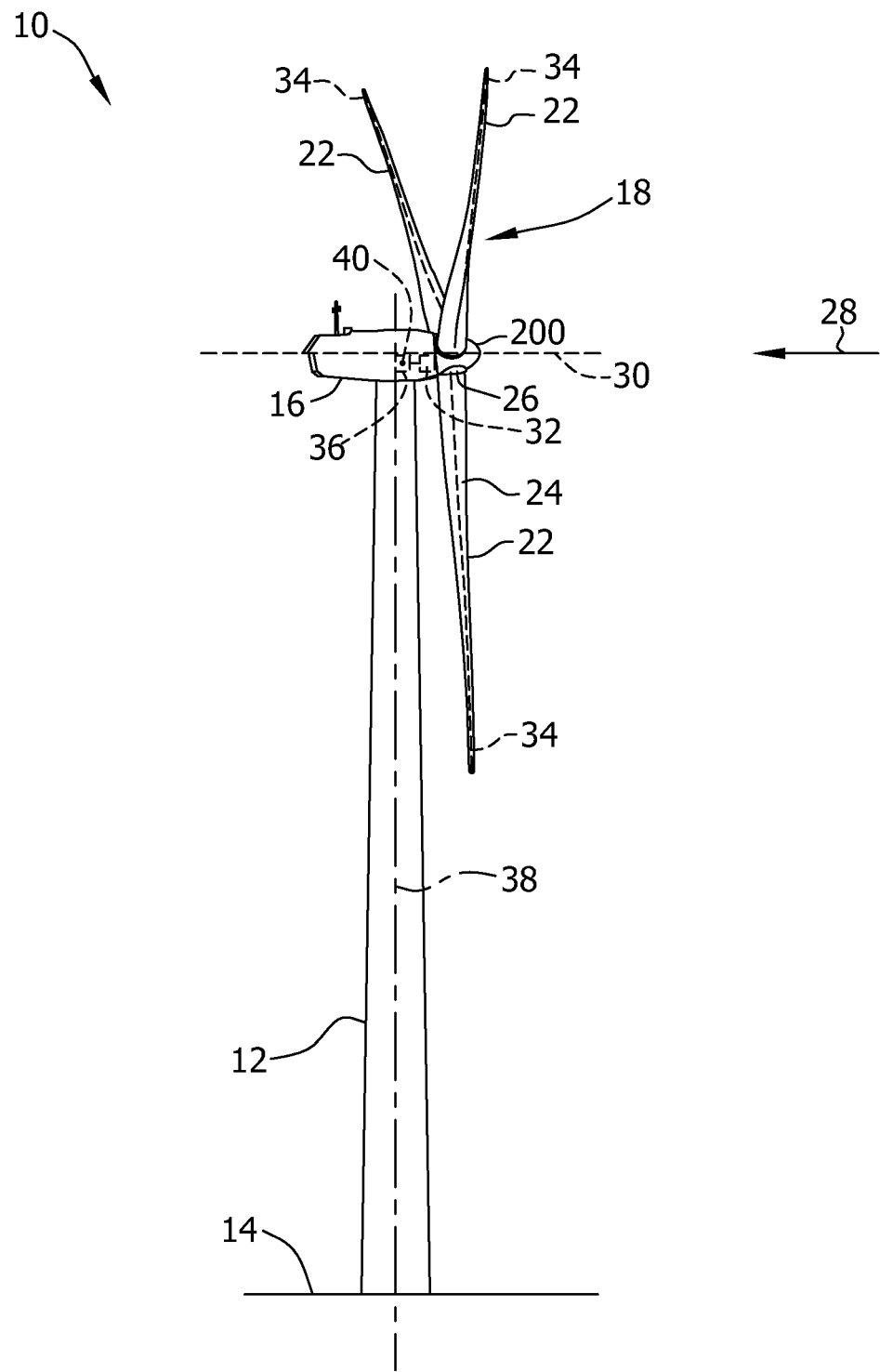
FIG. 1 is a perspective view of an exemplary wind turbine.

FIG. 1 is a perspective view of an exemplary wind turbine 10. In the exemplary embodiment, wind turbine 10 is a horizontal-axis wind turbine. Alternatively, wind turbine 10 may be a vertical-axis wind turbine. In the exemplary embodiment, wind turbine 10 includes a tower 12 that extends from a support system 14, a nacelle 16 mounted on tower 12, and a rotor 18 that is coupled to nacelle 16. Rotor 18 includes a rotatable hub 20 and at least one rotor blade 22 coupled to and extending outward from hub 20. In the exemplary embodiment, rotor 18 has three rotor blades 22. In an alternative embodiment, rotor 18 includes more or less than three rotor blades 22. In the exemplary embodiment, tower 12 is fabricated from tubular steel to define a cavity (not shown in FIG. 1) between support system 14 and nacelle 16. In an alternative embodiment, tower 12 is any suitable type of tower having any suitable height. In an embodiment, hub 200 is a modular hub as described later.

Rotor blades 22 are spaced about hub 200 to facilitate rotating rotor 18 to enable kinetic energy to be transferred from the wind into usable mechanical energy, and subsequently, electrical energy. Rotor blades 22 are mated to hub 200 by coupling a blade root portion 24 to hub 200 at a plurality of load transfer regions 26. Load transfer regions 26 have a hub load transfer region and a blade load transfer region (both not shown in FIG. 1). Loads induced to rotor blades 22 are transferred to hub 200 via load transfer regions 26.

In one embodiment, rotor blades 22 have a length ranging from about 15 meters (m) to about 91 m. Alternatively, rotor blades 22 may have any suitable length that enables wind turbine 10 to function as described herein. For example, other non-limiting examples of blade lengths include 10 m or less, 20 m, 37 m, or a length that is greater than 91 m. As wind strikes rotor blades 22 from a direction 28, rotor 18 is rotated about an axis of rotation 30. As rotor blades 22 are rotated and subjected to centrifugal forces, rotor blades 22 are also subjected to various forces and moments. As such, rotor blades 22 may deflect and/or rotate from a neutral, or non-deflected, position to a deflected position.

Moreover, a pitch angle or blade pitch of rotor blades 22, i.e., an angle that determines a perspective of rotor blades 22 with respect to direction 28 of the wind, may be changed by a pitch adjustment system 32 to control the load and power generated by wind turbine 10 by adjusting an angular position of at least one rotor blade 22 relative to wind vectors. Pitch axes 34 for rotor blades 22 are shown. During operation of wind turbine 10, pitch adjustment system 32 may change a blade pitch of rotor blades 22 such that rotor blades 22 are moved to a feathered position, such that the perspective of at least one rotor blade 22 relative to wind vectors provides a minimal surface area of rotor blade 22 to be oriented towards the wind vectors, which facilitates reducing a rotational speed of rotor 18 and/or facilitates a stall of rotor 18.

In the exemplary embodiment, a blade pitch of each rotor blade 22 is controlled individually by a control system 36. Alternatively, the blade pitch for all rotor blades 22 may be controlled simultaneously by control system 36. Further, in the exemplary embodiment, as direction 28 changes, a yaw direction of nacelle 16 may be controlled about a yaw axis 38 to position rotor blades 22 with respect to direction 28.

In the exemplary embodiment, control system 36 is shown as being centralized within nacelle 16, however, control system 36 may be a distributed system throughout wind turbine 10, on support system 14, within a wind farm, and/or at a remote control center. Control system 36 includes a processor 40 configured to perform the methods and/or steps described herein. Further, many of the other components described herein include a processor. As used herein, the term "processor" is not limited to integrated circuits referred to in the art as a computer, but broadly refers to a controller, a microcontroller, a microcomputer, a programmable logic controller (PLC), an application specific integrated circuit, and other programmable circuits, and these terms are used interchangeably herein. It should be understood that a processor and/or a control system can also include memory, input channels, and/or output channels.

In the embodiments described herein, memory may include, without limitation, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, input channels include, without limitation, sensors and/or computer peripherals associated with an operator interface, such as a mouse and a keyboard. Further, in the exemplary embodiment, output channels may include, without limitation, a control device, an operator interface monitor, and/or a display.

Processors described herein process information transmitted from a plurality of electrical and electronic devices that may include, without limitation, sensors, actuators, compressors, control systems, and/or monitoring devices. Such processors may be physically located in, for example, a control system, a sensor, a monitoring device, a desktop computer, a laptop computer, a programmable logic controller (PLC) cabinet, and/or a distributed control system (DCS) cabinet. RAM and storage devices store and transfer information and instructions to be executed by the processor(s). RAM and storage devices can also be used to store and provide temporary variables, static (i.e., non-changing) information and instructions, or other intermediate information to the processors during execution of instructions by the processor(s). Instructions that are executed may include, without limitation, wind turbine control system control commands. The execution of sequences of instructions is not limited to any specific combination of hardware circuitry and software instructions.

Figure 2:
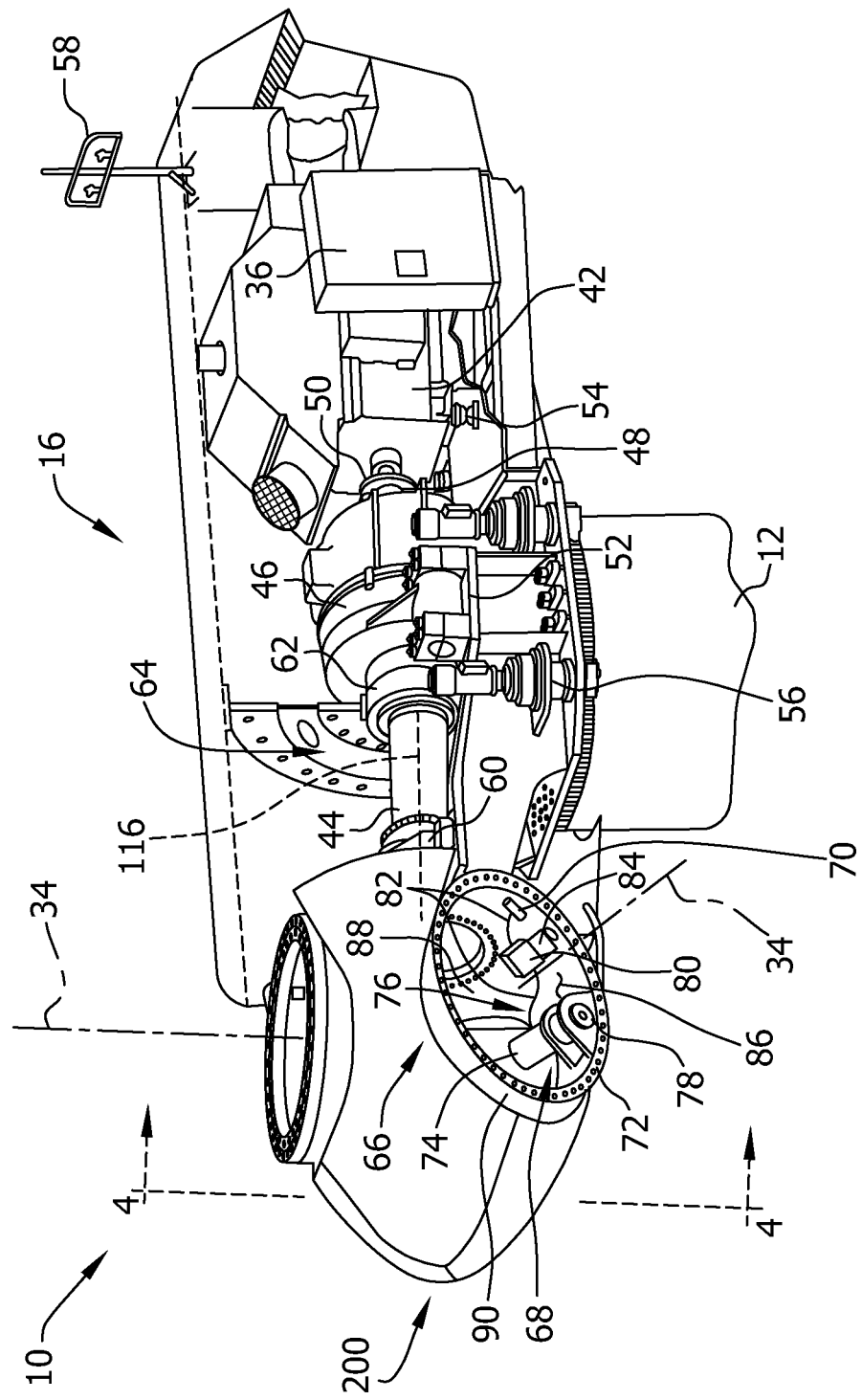
FIG. 2 is an enlarged sectional view of a portion of the wind turbine shown in FIG. 1.

FIG. 2 is an enlarged sectional view of a portion of wind turbine 10. In the exemplary embodiment, wind turbine 10 includes nacelle 16 and hub 20 that is rotatably coupled to nacelle 16. More specifically, hub 200 is rotatably coupled to an electric generator 42 positioned within nacelle 16 by rotor shaft 44 (sometimes referred to as either a main shaft or a low speed shaft), a gearbox 46, a high speed shaft 48, and a coupling 50. In the exemplary embodiment, rotor shaft 44 is disposed coaxial to longitudinal axis 116. Rotation of rotor shaft 44 rotatably drives gearbox 46 that subsequently drives high speed shaft 48. High speed shaft 48 rotatably drives generator 42 with coupling 50 and rotation of high speed shaft 48 facilitates production of electrical power by generator 42. Gearbox 46 and generator 42 are supported by a support 52 and a support 54, respectively. In the exemplary embodiment, gearbox 46 utilizes a dual path geometry to drive high speed shaft 48. Alternatively, rotor shaft 44 is coupled directly to generator 42 with coupling 50.

Nacelle 16 also includes a yaw drive mechanism 56 that may be used to rotate nacelle 16 and hub 200 on yaw axis 38 (shown in FIG. 1) to control the perspective of rotor blades 22 with respect to direction 28 of the wind. Nacelle 16 also includes at least one meteorological mast 58 that includes a wind vane and anemometer (neither shown in FIG. 2). Mast 58 provides information to control system 36 that may include wind direction and/or wind speed. In the exemplary embodiment, nacelle 16 also includes a main forward support bearing 60 and a main aft support bearing 62.

Forward support bearing 60 and aft support bearing 62 facilitate radial support and alignment of rotor shaft 44. Forward support bearing 60 is coupled to rotor shaft 44 near hub 20. Aft support bearing 62 is positioned on rotor shaft 44 near gearbox 46 and/or generator 42. Alternatively, nacelle 16 includes any number of support bearings that enable wind turbine 10 to function as disclosed herein. Rotor shaft 44, generator 42, gearbox 46, high speed shaft 48, coupling 50, and any associated fastening, support, and/or securing device including, but not limited to, support 52 and/or support 54, and forward support bearing 60 and aft support bearing 62, are sometimes referred to as a drive train 64.

In the exemplary embodiment, hub 200 includes a pitch assembly 66. Pitch assembly 66 includes one or more pitch drive systems 68 and at least one sensor 70. Each pitch drive system 68 is coupled to a respective rotor blade 22 (shown in FIG. 1) for modulating the blade pitch of associated rotor blade 22 along pitch axis 34. Only one of three pitch drive systems 68 is shown in FIG. 2.

In the exemplary embodiment, pitch assembly 66 includes at least one pitch bearing 72 coupled to hub 200 and to respective rotor blade 22 (shown in FIG. 1) for rotating respective rotor blade 22 about pitch axis 34. Pitch drive system 68 includes a pitch drive motor 74, pitch drive gearbox 76, and pitch drive pinion 78. Pitch drive motor 74 is coupled to pitch drive gearbox 76 such that pitch drive motor 74 imparts mechanical force to pitch drive gearbox 76. Pitch drive gearbox 76 is coupled to pitch drive pinion 78 such that pitch drive pinion 78 is rotated by pitch drive gearbox 76. Pitch bearing 72 is coupled to pitch drive pinion 78 such that the rotation of pitch drive pinion 78 causes rotation of pitch bearing 72. More specifically, in the exemplary embodiment, pitch drive pinion 78 is coupled to pitch bearing 72 such that rotation of pitch drive gearbox 76 rotates pitch bearing 72 and rotor blade 22 about pitch axis 34 to change the blade pitch of blade 22.

Pitch drive system 68 is coupled to control system 36 for adjusting the blade pitch of rotor blade 22 upon receipt of one or more signals from control system 36. In the exemplary embodiment, pitch drive motor 74 is any suitable motor driven by electrical power and/or a hydraulic system that enables pitch assembly 66 to function as described herein. Alternatively, pitch assembly 66 may include any suitable structure, configuration, arrangement, and/or components such as, but not limited to, hydraulic cylinders, springs, and/ or servo-mechanisms. Moreover, pitch assembly 66 may be driven by any suitable means such as, but not limited to, hydraulic fluid, and/or mechanical power, such as, but not limited to, induced spring forces and/or electromagnetic forces. In certain embodiments, pitch drive motor 74 is driven by energy extracted from a rotational inertia of hub 200 and/or a stored energy source (not shown) that supplies energy to components of wind turbine 10.

Pitch assembly 66 also includes one or more overspeed control systems 80 for controlling pitch drive system 68 during rotor overspeed. In the exemplary embodiment, pitch assembly 66 includes at least one overspeed control system 80 communicatively coupled to respective pitch drive system 68 for controlling pitch drive system 68 independently of control system 36. In one embodiment, pitch assembly 66 includes a plurality of overspeed control systems 80 that are each communicatively coupled to respective pitch drive system 68 to operate respective pitch drive system 68 independently of control system 36. Overspeed control system 80 is also communicatively coupled to sensor 70. In the exemplary embodiment, overspeed control system 80 is coupled to pitch drive system 68 and to sensor 70 with a plurality of cables 82. Alternatively, overspeed control system 80 is communicatively coupled to pitch drive system 68 and to sensor 70 using any suitable wired and/or wireless communications device. During normal operation of wind turbine 10, control system 36 controls pitch drive system 68 to adjust a pitch of rotor blade 22. In one embodiment, when rotor 18 operates at rotor overspeed, overspeed control system 80 overrides control system 36, such that control system 36 no longer controls pitch drive system 68 and overspeed control system 80 controls pitch drive system 68 to move rotor blade 22 to a feathered position to slow a rotation of rotor 18.

A power generator 84 is coupled to sensor 70, overspeed control system 80, and pitch drive system 68 to provide a source of power to pitch assembly 66. In the exemplary embodiment, power generator 84 provides a continuing source of power to pitch assembly 66 during operation of wind turbine 10. In an alternative embodiment, power generator 84 provides power to pitch assembly 66 during an electrical power loss event of wind turbine 10. The electrical power loss event may include power grid loss, malfunctioning of the turbine electrical system, and/or failure of the wind turbine control system 36. During the electrical power loss event, power generator 84 operates to provide electrical power to pitch assembly 66 such that pitch assembly 66 can operate during the electrical power loss event.

In the exemplary embodiment, pitch drive system 68, sensor 70, overspeed control system 80, cables 82, and power generator 84 are each positioned in a cavity 86 defined by an inner surface 88 of hub 20. In a particular embodiment, pitch drive system 68, sensor 70, overspeed control system 80, cables 82, and/or power generator 84 are coupled, directly or indirectly, to inner surface 88. In an alternative embodiment, pitch drive system 68, sensor 70, overspeed control system 80, cables 82, and power generator 84 are positioned with respect to an outer surface 90 of hub 200 and may be coupled, directly or indirectly, to outer surface 90.

Figure 3:
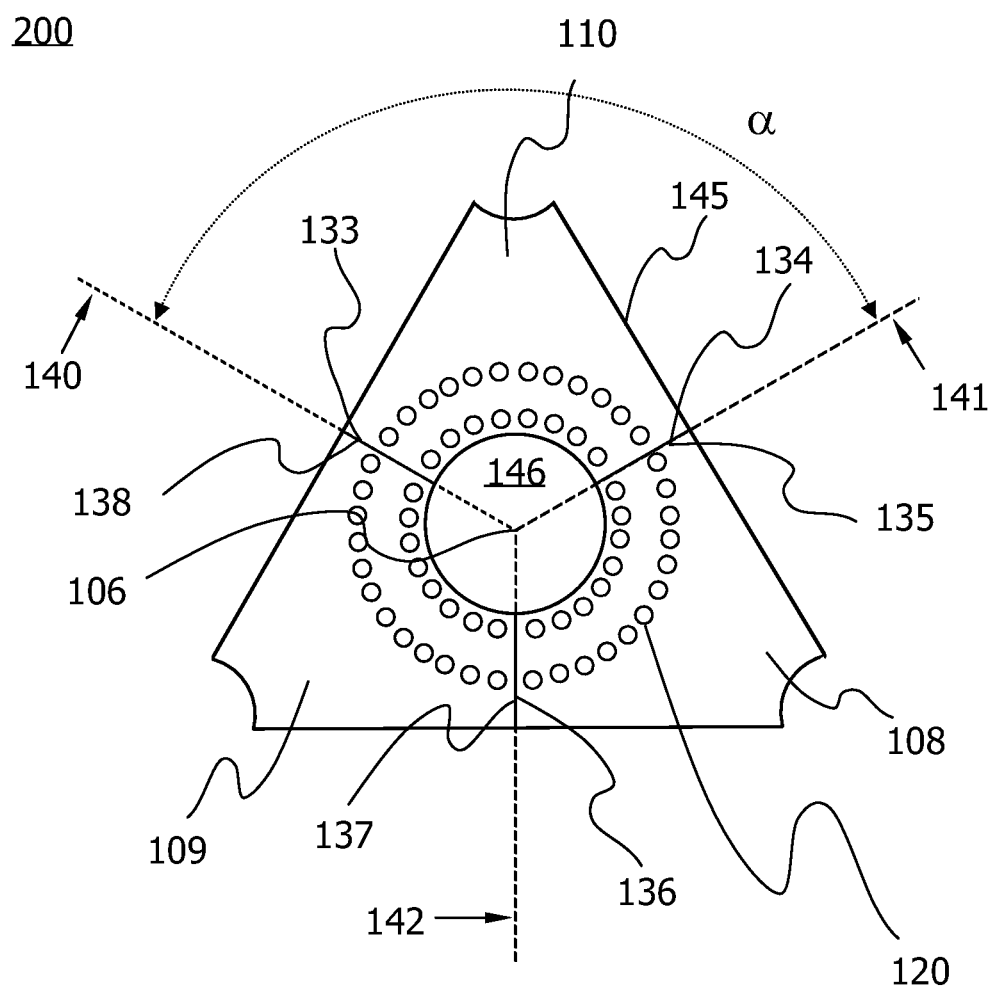
FIG. 3 is a perspective view of a modular rotor blade hub according to embodiments.

FIG. 3 shows an embodiment of a modular rotor blade hub 200 for a rotor with three rotor blades. The hub 200 includes three segments 108, 109, 110. In the exemplary embodiment, the segments are substantially identical and are designed such that the abutting faces 133, 134, 135, 136, 137, 138 of adjacent abutting segments 108, 109, 110 form three planes 140, 141, 142. "Substantially identical" means, in this respect, that the outer dimensions of the segments do not differ more than 15 percent between the segments, either in terms of width, height, or length.

For instance, face (or side face) 133 of segment 110 abuts against face (or side face) 138 of segment 109, thereby defining plane 140, and face 137 of segment 109 abuts against face 136 of segment 108, thereby defining plane 142.

In the exemplary embodiment, the faces 133, 134, 135, 136, 137 138 of the segments 108, 109, 110 extend from an outer periphery 145 of the hub to a central region 146 of the hub. Per definition, in embodiments not limited to the exemplary embodiment shown in FIG. 3, the central region 146 of the hub includes the hole in the middle of the hub and the directly abutting faces of the segments 108, 109, 110. The term "face" is used herein in the conventional meaning of a surface of a body, particularly of a segment, but also for a face as a representation of the boundary between abutting segments.

In other embodiments, the hub and segments are constructed differently and have a different shape, which results in the fact that the term "central region" is also defined differently. For instance, if at least one face of at least one segment compasses at least a part of the rotational middle axis of the hub (differently from the embodiment of FIG. 4), the central region is defined to be the geometrical rotational axis 106. In another embodiment, a face is defined to extend from an outer periphery of the hub to a central region, if any spot of the face lies on the outer periphery of the hub, and if any second spot of the face lies on the face of a geometrical body which is formed by the innermost faces of the segments with respect to the axis, and which at least partly compasses the geometrical rotational axis of the hub. It is understood that a modular hub may be designed in various ways which cannot all be described in here. Though, a common feature between the variants is regarded to be, that at least one of the faces between abutting segments extends from an outer periphery of the hub to an innermost part or region ("central region") of the hub. At the same time, the face can extend from the outer periphery to the inner part or region in a linear direction or in a non-linear direction, which means a cross-sectional projection of the face may exhibit curves, and/or angles. Further, the face can abut more than two segments, if, for example, the hub includes two layers of segments with respect to a radial direction.

In the exemplary embodiment of FIG. 3, faces 133, 134, 135, 136, 137 138 extend from the outer periphery 145 to the central region 146 in a radial direction and are plane surfaces. In other embodiments, the faces may extend from the outer periphery to a central region in directions which are non-radial, and/or the faces may deviate from a plane shape. For instance, in other embodiments the faces may have the form of a cylinder segment with constant or varying radius.

The planes 140, 141, 142 each include the geometrical middle axis (or rotational axis) 106 of hub 200. They enclose an angle α each with adjacent planes, which is 120° between each of the adjacent planes in the exemplary embodiment of FIG. 3.

The faces 133, 134, 135, 136, 137, 138 of the segments facing the adjacent segments are substantially plane in order to allow for cost effective production and to allow for a fit between the adjacent and abutting segments 108, 109, 110. "Substantially plane" means that the face is still regarded as plane, as long as more than 60 percent of the area of the face forms a geometrical plane. In other embodiments, the faces may deviate from a plane shape.

In the exemplary embodiment, the modular hub has three planes of symmetry (planes 140, 141, and 142), which each include the rotational axis 106 of the hub, which is also a cyclic axis of symmetry of the hub.

Figure 4:
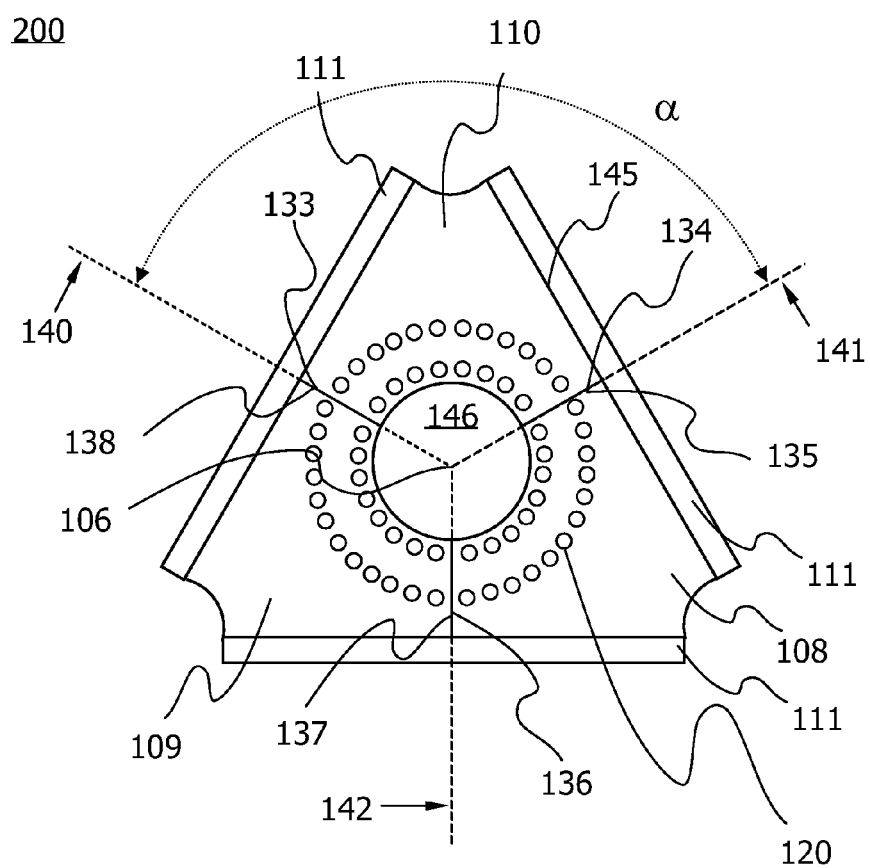
FIG. 4 is a perspective view of the modular rotor blade hub of FIG. 3 with interface hubs according to embodiments.

FIG. 4 shows the embodiment of FIG. 3, further including three bolted joints 111, henceforth called interface hubs, which serve as interfaces between the hub 200 and the rotor blades 22. In the exemplary embodiment, they also serve as connection means between segments 108, 109, 110, wherein each interface hub 111 connects two segments. Accordingly, the interface hubs also serve as connection means between individual segments 108, 109, 110.

In the embodiment, planes 140, 141, and 142 are each parallel to a longitudinal axis of a rotor blade 22 (not shown) mounted to the respective segments via interface hubs 111 (not shown). Hence, plane 140 is parallel to the longitudinal axis of the rotor blade mounted to segments 109 and 110, plane 141 is parallel to the longitudinal axis of the rotor blade mounted to segments 110 and 108, and plane 142 is parallel to the axis of the rotor blade mounted to segments 108 and 109. As can be seen in FIG. 3, the modular hub is rotationally symmetrical about its rotational axis 106, i.e., a rotation of 120° about axis 106 yields the same hub. Accordingly, the segments 108, 109, 110 are also cyclically symmetric to each other about the rotational axis 106 of the hub 200.

Planes 140, 141, and 142 each include the rotational axis 106 of the hub. The angles α between adjacent planes are 120° each, i.e., between plane 140 and plane 141 or between plane 141 and plane 142. The number of segments 108, 109, 110 is three in the exemplary embodiment, which is equal to the number of rotor blades 22 which can be mounted to the hub. The segments are arranged in a substantially circular manner about the rotational axis 106 of hub 200. "Arranged in a substantially circular manner" means that the geometric positions of the different centers of mass of the segments have substantially the same distance from the rotational axis of the hub, meaning the individual distances from the hub vary less than 20 percent, more specifically less than 10 percent, even more specifically less than 2 percent. In the exemplary embodiment, the segments 108, 109, 110 each include an arrangement of bolt holes 120. These bolt holes are arranged such that the assembled hub 200 features at least two redundant, concentric, substantially circular arrangements of bolt holes 120 on its front face. The bolt holes are typically, but not necessarily coplanar. "Substantially circular arrangement" means that the bolt holes are arranged such that their specific bolt pattern relative to the rotational axis of the hub (or, in another respect, relative to the rotational axis of the blade) defines a closed arrangement curve over 360° angle within a plane.

When mounting or assembling the hub from the segments 108, 109, 110, the segments are arranged such that they yield the hub as shown in FIG. 3. Then, a typically circular front plate 117 (not shown) featuring two corresponding arrangements of bolt holes 120 is positioned on the front face of the assembled hub 200 and fixed to it via bolts. In FIGS. 3 and 4, the front face of the hub, to which the front plate is mountable, is facing towards the viewer.

In the exemplary embodiments of FIG. 4, the hub is adapted such that each rotor blade is mounted to two segments 108, 109, 110 via an interface hub 111.

It is understood that in other embodiments, the shape of the segments may differ. As an example, the side faces between the segments (forming planes 140, 141, and 142 in the exemplary embodiments of FIG. 3 and FIG. 4) may include stages or spacers; for instance, plates of rubber, plastic material, metal plates, or the like may be provided between the segments. Also, the number of segments may differ, especially in hubs for rotors with a different number of rotor blades. As a general rule, the angle α between adjacent planes between segments is from 30° to 180°, more specifically from 90° to 180°.

In an embodiment for a rotor with two rotor blades 22, the modular hub 200 typically includes two segments. In an embodiment for a rotor having three rotor blades as described above, the hub typically includes three segments. In a further embodiment described below, each of the three segments include two mirror-symmetrical sub-segments, hence the hub includes six sub-segments in total. Mirror-symmetrical means that the shape of two sub-segments is such as if they were mirror images of each other. Substantially mirror-symmetrical means that two segments are mirror-symmetrical with respect to their outline and their basic dimensions, but that the sub-segments may differ in small details, for instance, a bolt hole in one segment which has no equivalent in its mirror-symmetrical counterpart. In an embodiment with a rotor with four rotor blades, the hub typically includes four segments and thus, if the segments include two sub-segments each, the hub includes eight sub-segments.

In the embodiments described herein, the number of segments of the hub 200 is identical to the number of blades of the rotor, or is twice that number in case the segments include two sub-segments each. More generally speaking, the hub typically includes a number of segments or sub-segments which is equal to the number of rotor blades of the rotor multiplied with a whole-number factor of 1 or greater.

Other embodiments may include numbers of segments not following the above relations. In all embodiments described herein, only segments which are elementary structural elements of the hub are regarded and counted as "segments"; hence bolts, fixation elements, parts of the pitch mechanism, and the like are not counted as segments. "Structural element" also means that the element is a significant structural part of the hub itself. Typically, a structural element as described herein has a weight greater than 5 percent of the total weight of the assembled hub without the rotor blades.

In other embodiments, the segments of hub 200 may be mounted together by different means additionally or alternatively to the front plate 117 and the interface hubs 111. Means and methods for this purpose are well known to a skilled person. For example, the segments may be joined by bolts connecting the segments at their abutting faces 133, 134, 135, 136, 137, 138, which are the faces forming planes 140, 141, and 142 in the embodiment of FIG. 3. To this end, the faces may be provided with through holes corresponding to through holes in the side faces of the abutting segments.

Figure 5:
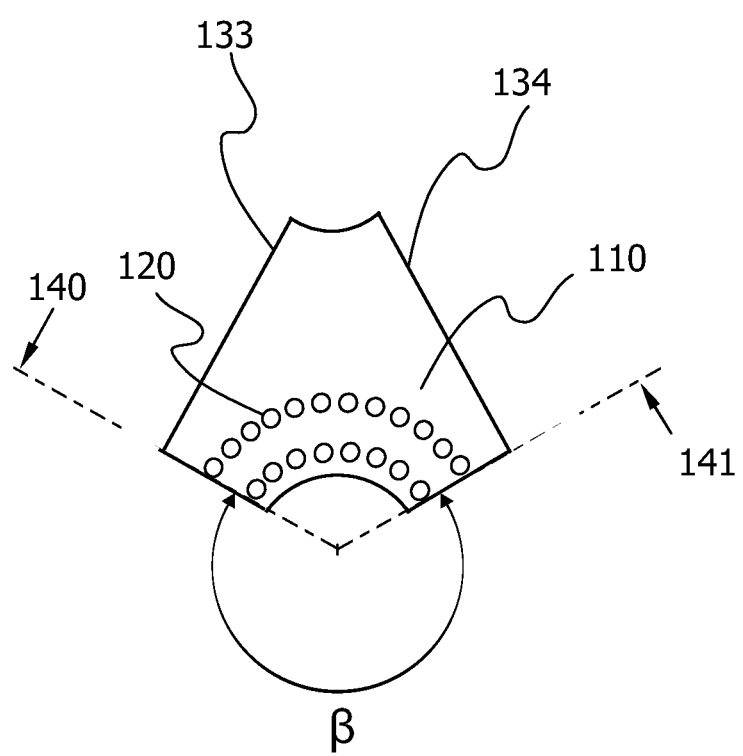
FIG. 5 is a perspective view of a segment of the modular rotor blade hubs shown in FIGS. 3 and 4.

FIG. 5 shows a segment 110 of the hub 200 of FIG. 3 and FIG. 4 with faces 133 and 134, showing the concentric circular arrangement of two rows of bolt holes 120 for mounting a front plate 117 (not shown) on the front of the assembled hub. At the rear face of the segment, not visible in FIG. 5, a similar arrangement of bolt holes 120 is provided for mounting the assembled hub to the main shaft 44 of the wind turbine. Angle β is a characteristic for segments of the modular hub 200 and relates to the aforementioned angle in that 0 equals 360° minus α. In the exemplary embodiment, β is 240°. In other embodiments, the angle may be from 180° to 330°.

Figure 6:
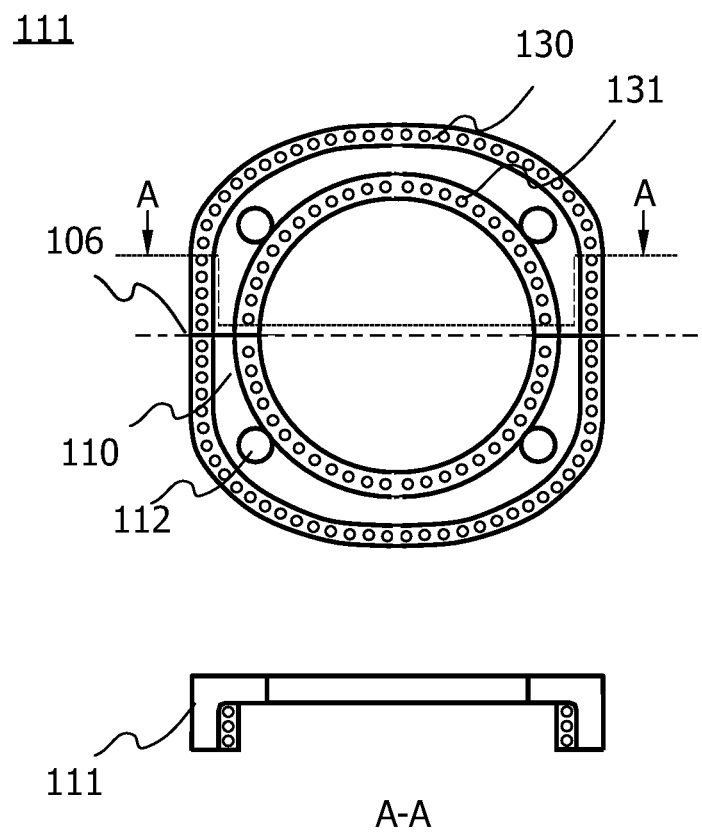
FIG. 6 provides a perspective view and a cross-sectional view of an interface hub as shown in FIG. 4.

FIG. 6 shows a perspective view (top) and a cross-sectional view along line A-A (bottom) of an interface hub 111 as shown in FIG. 4. The interface hub 111 forms an interface between the segments of the hub and a rotor blade 22 (not shown). The blade is mounted to the interface hub 111 via bolts; accordingly, typically two arrangements of bolt holes 130, 131 are provided in the interface hub. Further, through holes 112 are provided in the interface hub 111 for mounting a blade pitch bearing and/or pitch actuators (not shown).

Figure 7:
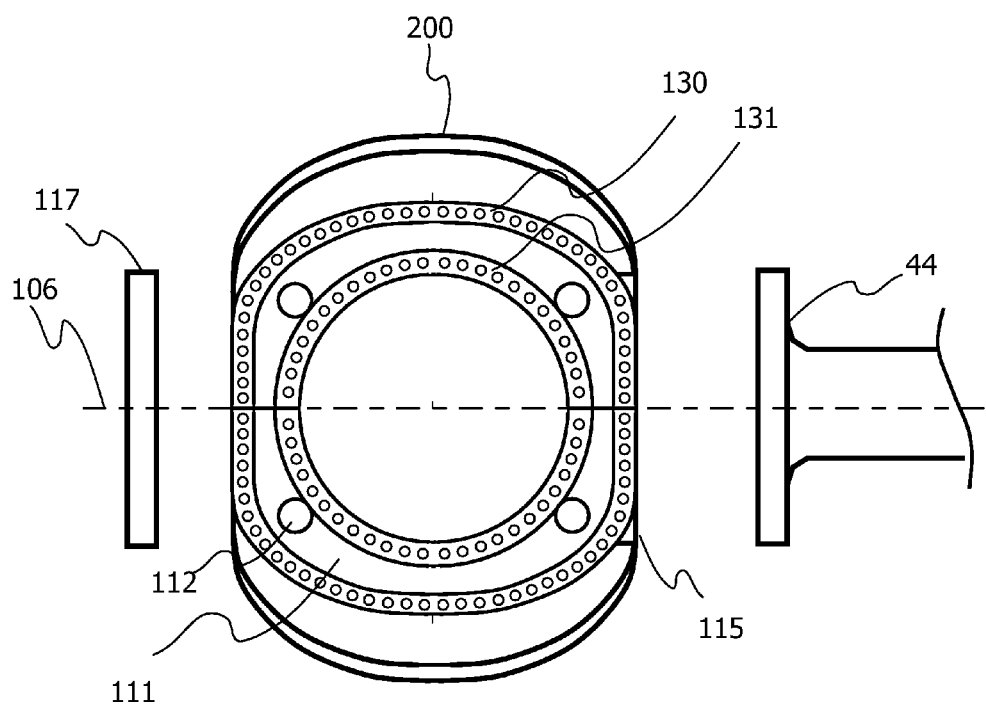
FIG. 7 is a side view of the rotor blade hub shown in FIG. 4 together with the front plate and the wind turbine main shaft.

FIG. 7 shows a side view of the assembled hub 200 as shown in FIG. 4 together with front plate 117 (not mounted). The plate serves for mounting and fixating the segments by an arrangement of bolt holes. The plate typically has a round shape, but also other outlines such as a polygon or an ellipse are possible. The holes are typically arranged in a circle or in at least two substantially circular arrangements, which may be coplanar and/or concentric. Thereby, two or more arrangements provide for greater structural redundancy. This concept is also applied in mounting the rotor blades to interface hubs 110 via bolt hole arrangements 130, 131, see below. At plane 115, the hub 200 is typically mounted (not shown) to the rotor shaft 44 and, therefore, features a concentric arrangement of through holes. In an embodiment, the holes are arranged as two concentric circles to improve stability and redundancy. When mounting the hub to the nacelle 16, these are used to couple the hub 200 to the rotor shaft 44 via bolts. Hence, the different segments of the hub are each provided with an arrangement of holes typically forming a circle segment, such that the assembled hub features one or two circles of holes on its face facing the nacelle 16 and the shaft 44.

In the embodiment shown in FIGS. 6 and 7, each rotor blade 22 is mounted to hub 200 by a double junction 111. This double junction typically includes two concentric substantially circular arrangements 130, 131 of bolt holes. Accordingly, the load transfer regions between hub 200 and blades 22 (not shown) are divided into an inner region and an outer region. By so enhancing the region at which the rotor is coupled to the hub 200, the stability of the rotor-hub-system is improved. At the same time, the redundancy is increased. Accordingly, as more bolts are used for the connection and as the transmitted force is distributed over a wider region and more bolts, safety margins for the tolerable number of defect bolts may be increased. For instance, 10 percent of broken bolts may still be regarded as tolerable to allow further operation of the turbine.

Figure 8:
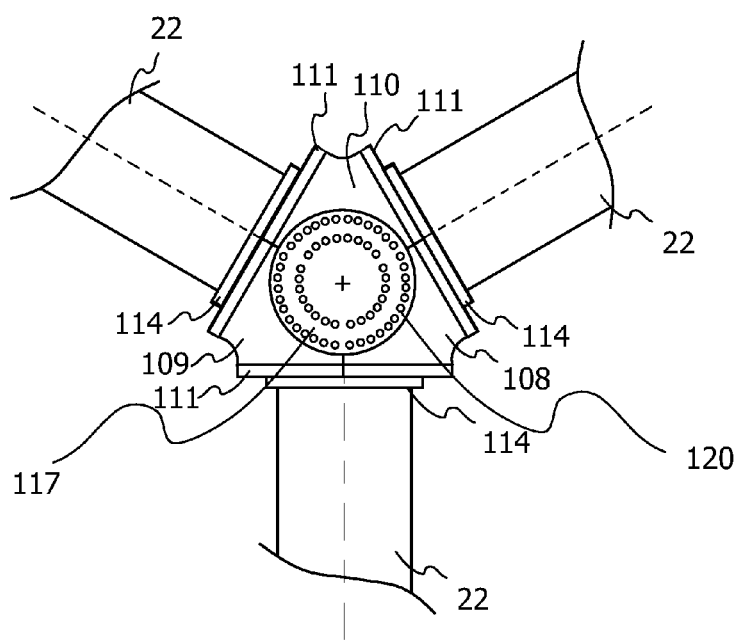
FIG. 8 is a front view of a wind turbine rotor with a modular rotor blade hub according to embodiments.

FIG. 8 shows an embodiment of a rotor with three rotor blades 22 mounted to a modular hub 200 including segments 108, 109, 110. The segments are mounted at their front faces with front plate 117. At interface hubs 111, bearings 114 are mounted which allow a pitch rotation of the blades 22.

FIG. 9 shows a sectional view of a rotor blade 22 mounted to interface hub 111 as in the previously described embodiments. Bearing 114, typically a roller bearing, enables the rotor blade 22 to rotate about its longitudinal axis in order to enable pitch variation. Methods for mounting a rotor blade to a hub are well known to the skilled person and are therefore not laid out in greater detail.

In order to allow for higher stability of the hub-blade-system, a double bearing may be provided, as is shown in the embodiment of FIG. 10. To this end, an extension 113 is mounted to interface hub 111. The extension has a through hole 112 extending along its longitudinal axis. At both end portions of the extension 113, bearings 114, 118 are arranged, which significantly further enhances the load bearing capacity and durability in comparison to the embodiment of FIG. 9.

Figure 11:
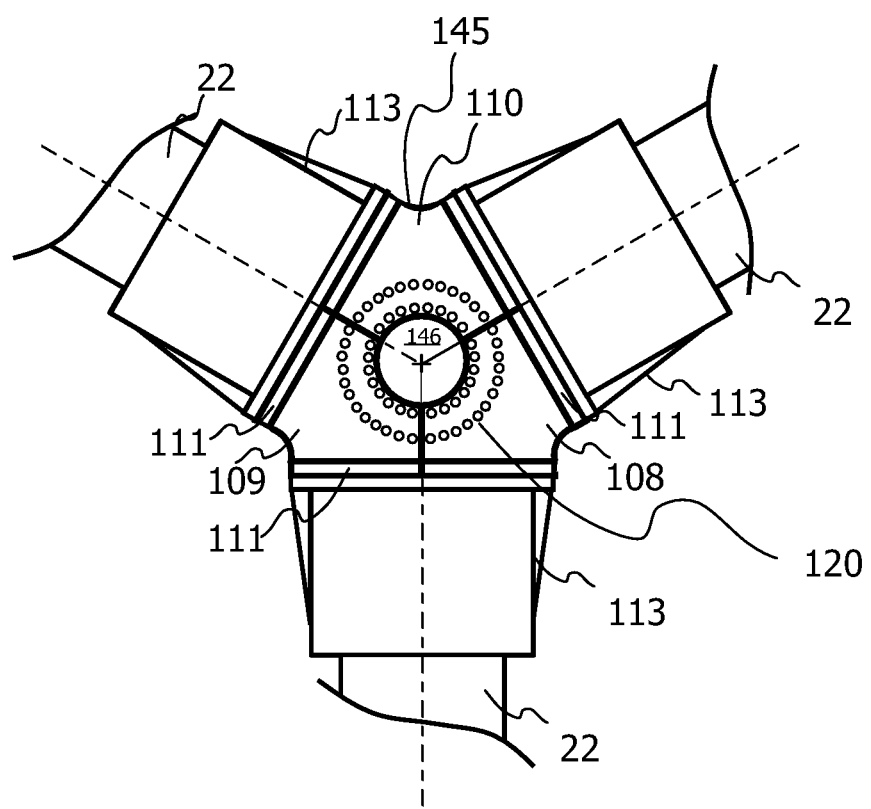
FIG. 11 is a front view of a wind turbine rotor with a modular rotor blade hub according to yet further embodiments.

FIG. 11 shows a further exemplary embodiment of a modular hub as shown in FIG. 7, in combination with extensions 113 of FIG. 10, including two bearings 114, 118 (not shown) each. Front plate 117 is not shown.

Figure 12:
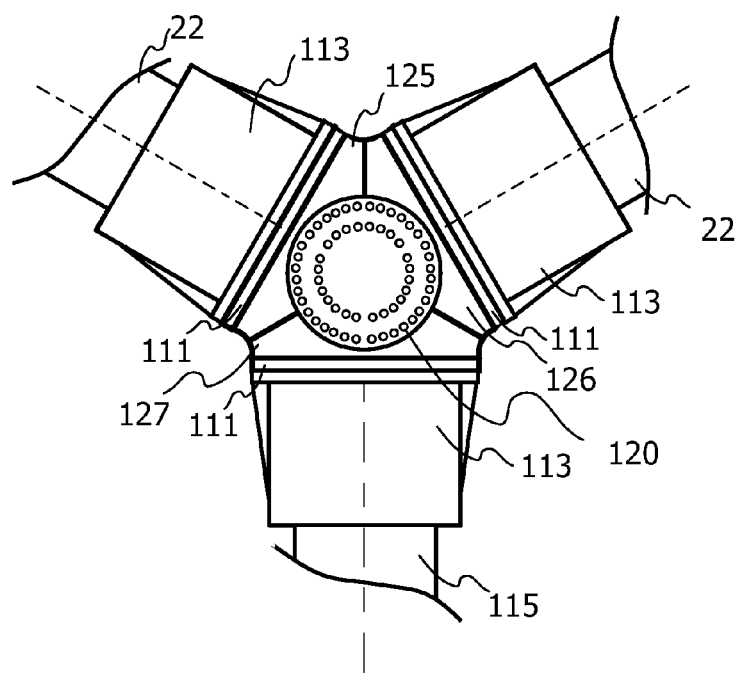
FIG. 12 is a front view of a wind turbine rotor with a modular rotor blade hub according to other embodiments.

FIG. 12 shows a further exemplary embodiment of a modular hub. Therein, segments 125, 126, 127 of the modular hub 200 have a different shape in comparison to the above described embodiments. They are designed such that each rotor blade 22 is mounted to only one of the segments, whereas in the previously described embodiments, each rotor blade is mounted to at least two segments each via interface hub 111.

Figure 13:
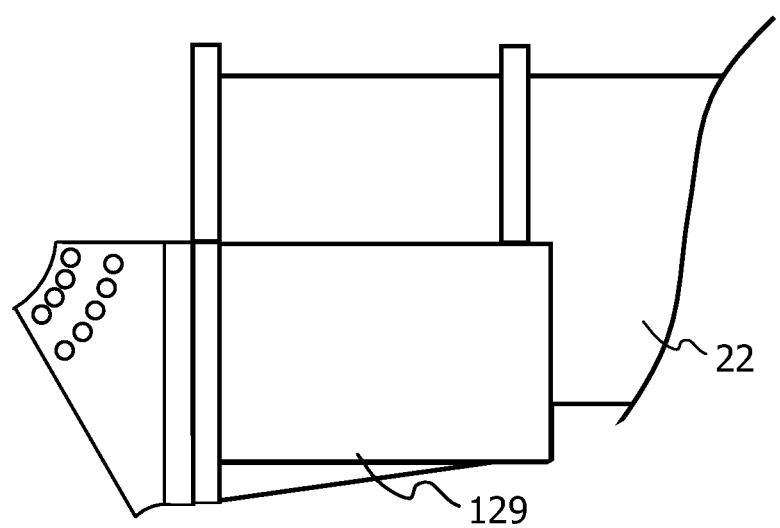
FIG. 13 is a front view of a wind turbine rotor blade with a mounted sub-segment of a modular rotor blade hub according to embodiments.

In an embodiment shown in FIG. 13, a rotor blade 22 with a mounted sub-segment 129 is shown. Accordingly, in this embodiment, each segment for mounting one rotor blade 22 includes two substantially mirror-symmetrical sub-segments 129. The second sub-segment is not shown in FIG. 13.

Figure 14:
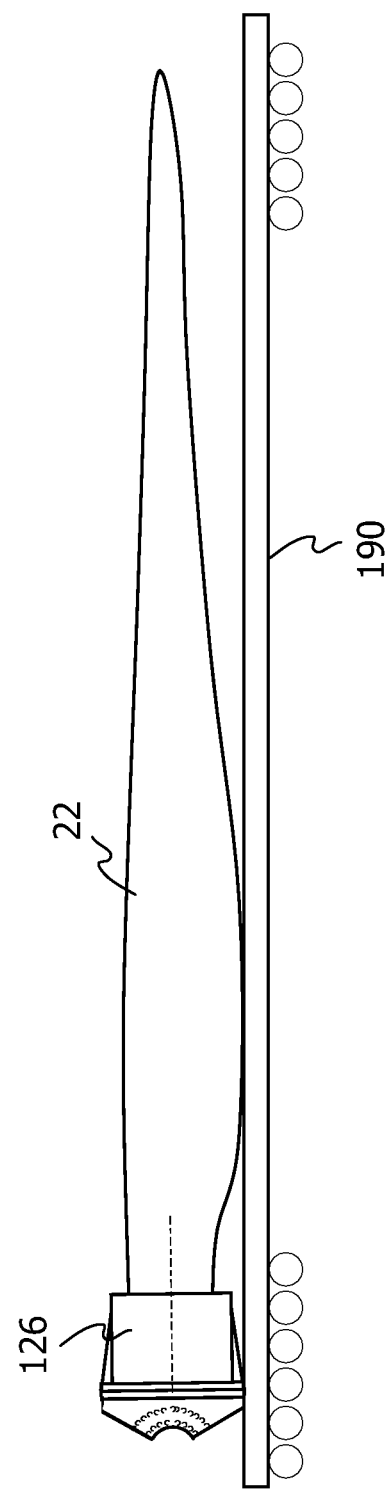
FIG. 14 is a front view of a rotor blade with a mounted segment of a rotor blade hub, which are positioned on a transport vehicle, according to embodiments.

FIG. 14 shows a rotor blade 22 with a pre-mounted hub segment 126 of the hub of FIG. 11. The assembly is supported by a transport vehicle 190, which is only schematically shown. The transport vehicle may be any transportation device suitable for at least one of the following: air, sea, or land transport.

Figure 15:
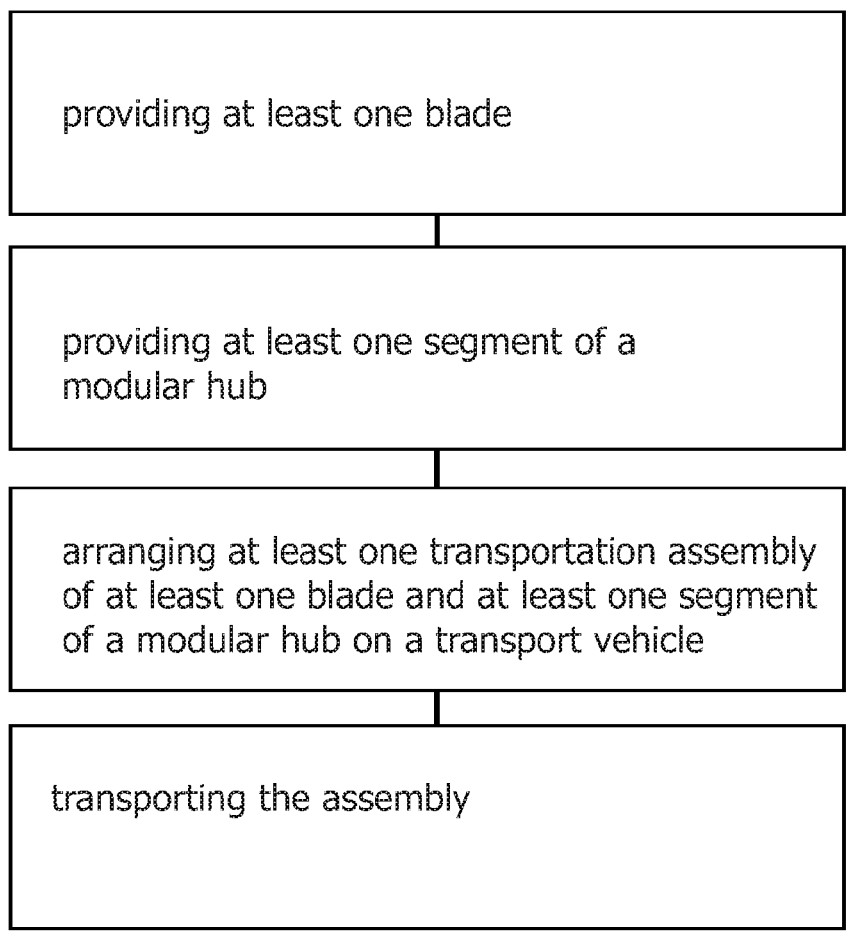
FIG. 15 shows a block diagram of a method of assembling a wind turbine according to embodiments.

It is understood that the above configurations save considerable effort, time, and cost, because the segments 108, 109, 110, 125, 126, 127 of the hub can be pre-mounted to the rotor blades 22 in the factory to form an assembly suitable for transportation. Hence, they need not be transported separately to the place of erection of the wind turbine. In one embodiment, one segment or one or more sub-segments of the hub can be pre-mounted to a rotor blade in the factory and the pre-assembled construction (assembly) is transported on a transport vehicle to the erection site of the wind turbine via air, land or sea transport. The transport method is schematically shown in FIG. 15.

Figure 16:
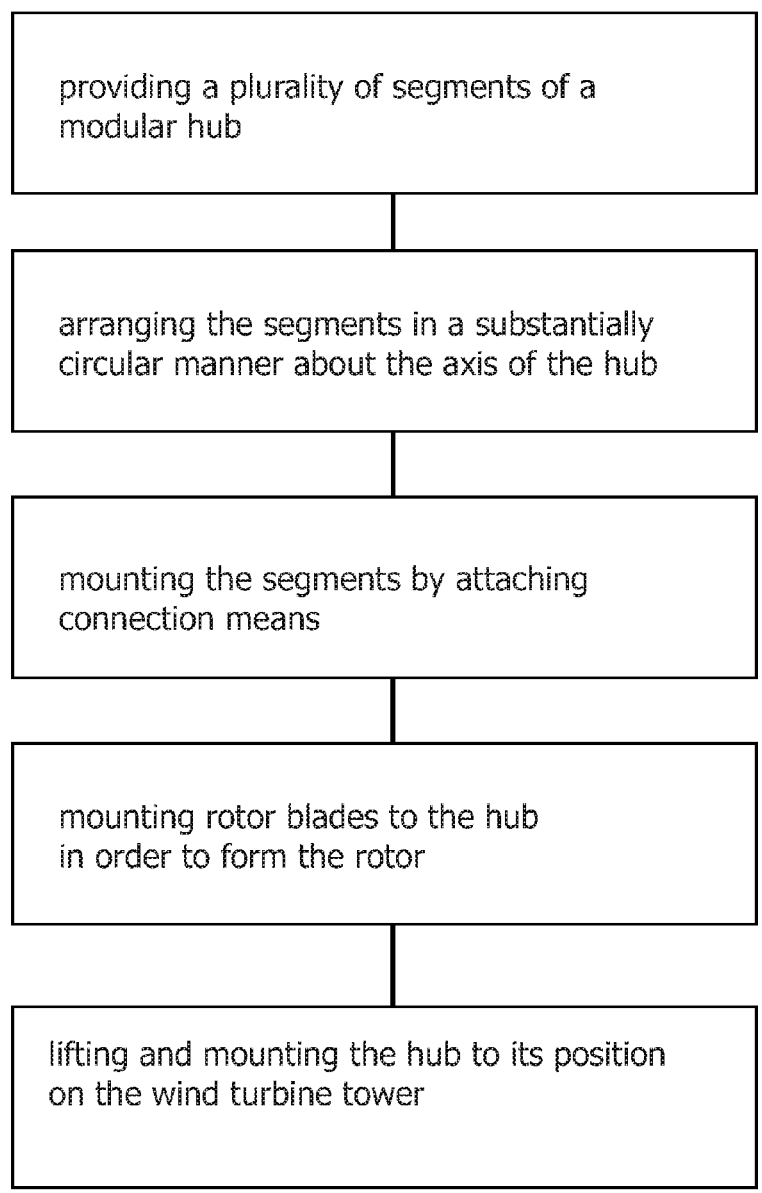
FIG. 16 shows a block diagram of a method of mounting a wind turbine according to embodiments.

At the construction site, the blades with the premounted hub segments are arranged in a substantially circular manner about the axis of the hub, mounted, for instance by attaching a connection means like front plate 117. Then, rotor blades are attached to the hub and fastened. Consecutively the completed rotor is lifted with a crane to its position on the wind turbine tower. This method is schematically shown in FIG. 16. This can also be applied for servicing and maintaining a wind turbine rotor during operating life cycle, wherein the hub or rotor is dismounted from the turbine and lowered with a crane to the ground. The repaired or serviced modular hub or rotor is then again lifted to its position at the nacelle according to the embodiments described.

Alternatively, in an embodiment, each rotor blade can be lifted and mounted separately (without a hub segment) and consecutively to the main shaft of the turbine, where the previously assembled hub is already mounted.

In a further embodiment, the segments or sub-segments of the hub are lifted separately to their positions at the main shaft of the turbine and are mounted there to form the hub. The rotor blades are thereafter lifted with a crane and are mounted to the hub.

It is understood that the concept of the modular hub also has consequences for the cost of maintenance of a wind turbine. If a modular hub has to be replaced during field operation of the turbine, considerable cost and effort can be spared, because the replacement modular hub is transported to the site in segments, which can be carried out with smaller and thus cheaper transport equipment than would be needed in transporting a one-piece-hub.

Exemplary embodiments of systems and methods for a modular rotor blade hub are described above in detail. The systems and methods are not limited to the specific embodiments described herein, but rather, components of the systems and/or steps of the methods may be utilized independently and separately from other components and/or steps described herein. For example, the modular hub may be utilized in machinery or installations other than wind turbines, and is not limited to practice with only the wind turbine systems as described herein. Rather, the exemplary embodiment can be implemented and utilized in connection with many other rotor applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. While various specific embodiments have been disclosed in the foregoing, those skilled in the art will recognize that the spirit and scope of the claims allows for equally effective modifications. Especially, mutually non-exclusive features of the embodiments described above may be combined with each other. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modular rotor blade hub for a wind turbine rotor, comprising a plurality of segments, wherein at least one segment includes at least one face abutting against at least one face of at least one adjacent segment, wherein at least one of said abutting faces between the segments extends from an outer periphery of the hub to a central region of the hub, and wherein the segments are joined together by a front plate which is mounted, through an arrangement of bolt holes, to front faces of the segments that face in a direction away from a nacelle of the wind turbine.

2. The modular rotor blade hub according to claim 1, wherein the abutting faces between the segments define planes, and at least one of the planes includes the rotational axis of the hub.

3. The modular rotor blade hub according to claim 2, wherein the planes each comprise the rotational axis of the hub, and the angle between adjacent planes is in the range from 30° to 180°.

4. The modular rotor blade hub according to claim 1, wherein the segments are arranged in a substantially circular manner about the axis of the hub, and wherein the segments are substantially identical.

5. The modular rotor blade hub according to claim 1, wherein the segments are at least partly cyclically symmetric to each other about the rotational axis of the hub.

6. The modular rotor blade hub according to claim 1, wherein the number of segments of the hub equals the number of rotor blades of the rotor multiplied by a whole-number factor which is equal to or greater than one.

7. The modular rotor blade hub according to claim 1, wherein each segment comprises two sub-segments, which are substantially mirror-symmetrical.

8. The modular rotor blade hub according to claim 1, wherein each segment comprises an arrangement of bolt holes for attaching a rotor blade.

9. The modular rotor blade hub according to claim 8, wherein at least one arrangement of bolt holes comprises two concentrical, substantially circular arrangements of bolt holes.

10. The modular rotor blade hub according to claim 1, wherein each segment comprises two arrangements of bolt holes for attaching rotor blades.

11. The modular rotor blade hub according to claim 1, wherein each segment is adapted to be mounted to one rotor blade or to two rotor blades.

12. The modular rotor blade hub according to claim 1, wherein the front plate comprises at least two arrangements of bolt holes, said arrangements of bolt holes being at least one of the following: substantially circular, coplanar, and concentric.

13. The modular rotor blade hub according to claim 1, wherein the segments further include arrangements of bolt holes on one face for mounting the hub to a main shaft of a wind turbine, and wherein the arrangements each include at least two arrangements of bolt holes, said arrangements of bolt holes being at least one of the following: substantially circular, coplanar, and concentric.

14. The modular rotor blade hub according to claim 1, further comprising an interface hub including a through hole, which accommodates a root portion of a rotor blade, and wherein a bearing is provided adjacent to the through hole.

15. The modular rotor blade hub according to claim 1, further comprising an extension element including a through hole and at least two bearings located distant from each other adjacent to the through hole.

16. A wind turbine comprising the modular rotor blade hub according to claim 1.

17. A method for mounting a wind turbine, comprising:
providing a plurality of segments of a modular hub;
arranging the segments in a substantially circular manner about the axis of the hub, such that at least one face of a segment abuts against at least one face of at least one adjacent segment, and wherein at least one of said faces extends from an outer periphery of the hub to a central region of the hub; and
joining the segments together by mounting a front plate, through an arrangement of bolt holes, to front faces of the segments that face in a direction away from a nacelle of the wind turbine.

18. The method according to claim 17, further comprising:
mounting rotor blades to the hub in order to form the rotor; and,
lifting and mounting the hub to its position on the wind turbine tower.

19. The method according to claim 17, further comprising:
providing at least one blade;
arranging at least one transportation assembly of at least one blade and at least one segment of a modular hub on a transport vehicle; and
transporting the assembly.

* * * * *